United States Patent [19]
Kohlberg

[11] 3,970,128
[45] July 20, 1976

[54] ORIENTATION OF CANT FOR TRANSLATORY FEED THROUGH EDGING CUTTERS

[75] Inventor: Ulrich Kohlberg, Jarfalla, Sweden

[73] Assignee: Saab-Scania Aktiebolag, Linkoping, Sweden

[22] Filed: Apr. 16, 1975

[21] Appl. No.: 568,609

[30] Foreign Application Priority Data
Apr. 22, 1974 Sweden .............................. 7405347

[52] U.S. Cl. ............................. 144/245 A; 144/312
[51] Int. Cl.² ...................... B27B 1/00; B27B 31/06
[58] Field of Search ............ 83/365, 367, 419, 421; 144/3 P, 245 R, 245 A, 312; 214/1 F, 1 PE, 1 MD; 226/20

[56] References Cited
UNITED STATES PATENTS

| | | | |
|---|---|---|---|
| 3,459,246 | 8/1969 | Ottosson | 144/312 |
| 3,736,968 | 6/1973 | Mason | 144/3 R X |
| 3,890,509 | 6/1975 | Maxey | 144/312 X |

FOREIGN PATENTS OR APPLICATIONS
155,044   6/1956   Sweden .......................... 144/245 A

*Primary Examiner*—Al Lawrence Smith
*Assistant Examiner*—Gary L. Smith

[57] ABSTRACT

A cant extending transversely across parallel belt conveyors moving in unison is carried forwardly by them to a scanning station at which the cant is arrested by engaging it at two points on its leading edge. The points of engagement define a reference line on the cant and a coinciding fixed datum line. After scanning, the cant is released to resume forward movement towards an orienting station at which the same two points on it are engaged by orienting stops adjusted to distances from the datum line that are determined by calculations based on scanning data. As arrested and oriented by the orienting stops, the cant is transferred to a roller conveyor that has bodily vertical motion relative to the belt conveyors. The roller conveyor translates the cant, in a direction transverse to the belt conveyor stretches, through edging cutters.

5 Claims, 7 Drawing Figures

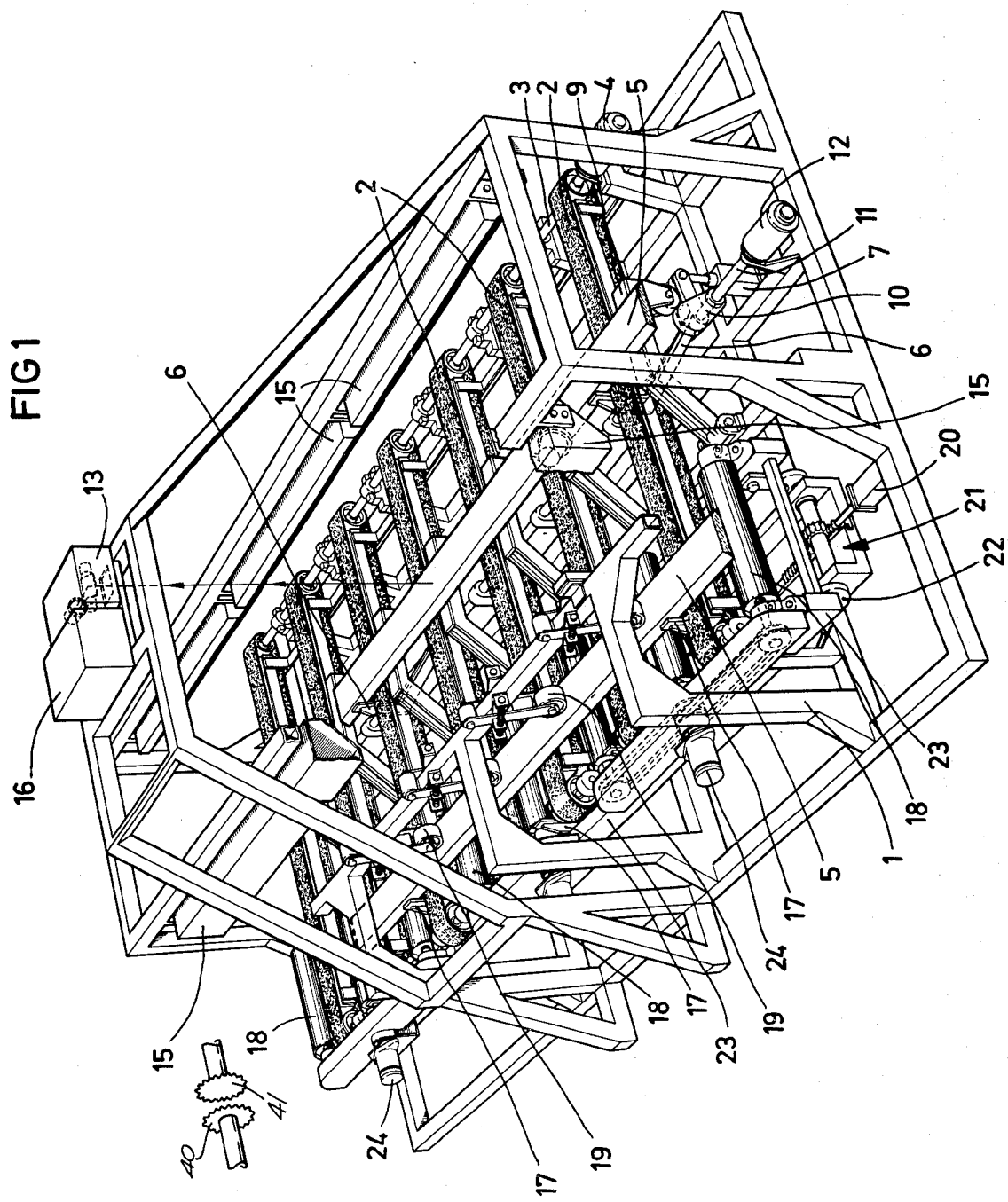

ORIENTATION OF CANT FOR TRANSLATORY FEED THROUGH EDGING CUTTERS

This invention relates to the trimming of cants (lumber pieces cut from a log and having flat and parallel top and bottom surfaces but untrimmed longitudinal edges); and the invention is more particularly concerned with the orientation of a cant in accordance with a calculation made on the basis of a scanning of it, so that the cant can be carried through edging cutters in translatory substantially lengthwise motion with such orientation, to enable the cutters to trim the cant to a finished piece of optimum size.

While the invention is applicable to workpieces other than lumber cants — as for example an uncropped steel bloom in a rolling mill — the orientation of a lumber cant particularly exemplifies the problem to which the invention is directed. It will be understood, therefore, that the term "cant" is herein used to designate any type of partly finished workpiece that poses the same general problems, and is intended as a term of general description without implying the particular material of which the partly finished workpiece is composed.

The wanes or unfinished longitudinal side surfaces of a cant may be very irregular and are usually oblique to its flat, parallel top and bottom surfaces. Since the cant is to be converted into one or more pieces that have finished parallel side surfaces which are straight and accurately perpendicular to the already-trimmed top and bottom surfaces, a certain amount of material must be discarded in the edge trimming operation by which the side surfaces are finished. In the interests of economy, the edge trimming cuts must be so planned that the least possible amount of material will be wasted. It will be evident that the orientation and spacing of the edging cuts that will achieve best economy of material are dependent upon the configuration of the narrower one of the two finished surfaces of the cant, which narrower surface can be regarded as its top surface.

It has been recognized for some time that the most advantageous orientation and spacing of the edging cuts can be calculated by means of a computer, which may be either a special purpose computer or a general purpose computer with a special but rather easily written program. It has also been recognized that the data inputs to such a computer, upon which its calculations would be based, can be obtained automatically by a scanning of the top surfaces of the cant to obtain information about the location of each of a number of points at spaced intervals along the longitudinal edges of that surface.

Probably the most rapid and accurate scanning apparatus heretofore devised for obtaining the necessary inputs to the computer is that disclosed in the copending application of B. Sanglert, U.S. Ser. No. 445,429 (now U.S. Pat. No. 3,886,372), which has a common assignee herewith. With that apparatus, the cant is held stationary at a scanning station while it is being scanned, so that the accuracy of the data obtained from scanning cannot be affected by jostling or shifting of the cant; and because the cant does not move during the actual scanning, it can be transported to the scanning station with either lengthwise motion wo with motion transversely to its length.

However, achieving a rapid and accurate scanning of the cant is only a part of the problem of achieving edging cuts that will produce the optimum finished piece. Because of the irregularity of the longitudinally extending wane surfaces, there is no inherently defined reference line on the cant to which the scanning data can be related. And even if a reference line is arbitrarily defined by one expedient or another, it is still necessary to so orient the cant for transport through the edging cutters that the reference line used during scanning will be at a predetermined angle to the direction of substantially lengthwise translatory motion of the cant through the cutters.

The general object of the present invention is to provide a method and means for so orienting a cant that a reference line thereon to which scanning data has been related during scanning of the cant at a scanning station will have a predetermined angle to the direction of translatory substantially lengthwise motion of the cant towards edging cutters, such orientation of the cant being in accordance with a calculation, based on data obtained during scanning, of the edging cuts that will convert the cant into a standardized finished piece of optimum size.

Another general object of the invention is to provide a method and apparatus for transporting a cant to a scanning station, holding it stationary at the scanning station while it is scanned, then transporting it further, from the scanning station to an orientation station at which it is established in a desired orientation for substantially lengthwise translatory motion towards and through edging cutters, and, finally, while maintaining such orientation of the cant, transferring it to conveyor means by which it is carried towards the edging cutters with such translatory motion.

Another and more specific object of the invention is to provide a method and apparatus for transporting and orienting cants that achieves the objectives set forth above, is well adapted for cooperation with scanning apparatus of the type disclosed in the above mentioned Sanglert application, and requires a minimum of floor area.

In general, the invention in its method aspect consists in drivingly supporting a cant for forward motion in a direction transverse to its length and along a defined path that extends through a scanning station; at the scanning station, arresting motion of the cant by engaging it at two points that are spaced from one another along its forward edge and which define a reference line on the cant to which data obtained during scanning is related and also define a fixed datum line at the scanning station; upon completion of scanning, releasing the cant to resume its forward motion and carry it from the scanning station towards an orienting station; at the orienting station, again arresting forward motion of the cant by engaging substantially the same two points thereon; adjusting the relative distances in the forward direction between said two points and the datum line in accordance with a calculation based on data obtained during scanning, to establish the cant in an orientation for substantially lengthwise translatory motion through edging cutters that will convert the cant to a finished piece of optimum size; and with the cant so oriented, transferring the cant, by vertical motion, to a conveyor that moves it towards the edging cutters with a translatory motion in a direction transverse to that of its said forward motion.

In its apparatus aspect the invention consists in the provision of a plurality of parallel, laterally spaced apart belt conveyors, all driven in the same direction and by which a cant that has its length transverse to the lengths of the conveyors is carried to a scanning station intermediate the ends of the conveyors; a pair of scanning stops at fixed locations at the scanning station, laterally spaced from belt conveyors and arranged to engage a cant on the belt conveyors at a pair of spaced apart points on its leading edge, thereby arresting the cant at the scanning station and defining a reference line on the cant which extends through said pair of points and which coincides with a fixed datum line; means mounting the scanning stops for vertical movement relative to the belt conveyors so that the scanning stops can be disengaged from a cant to allow it to resume its forward movement with the belt conveyors for transport to an orienting station; a pair of orienting stops at the orienting station, one for each scanning stop and each aligned in the forward direction with its scanning stop and arranged to engage the cant at said points on its leading edge and again arrest its forward motion with the belt conveyors; means for effecting adjustment of the orienting stops towards and from the datum line in accordance with calculations made on the basis of data obtained at the scanning station so that the cant, when arrested by the orienting stops, will be properly oriented for translation towards edging cutters in a direction transverse to the lengths of the belt conveyors; roller conveyor means at the orienting station, comprising rollers that have their axes parallel to and laterally spaced from stretches of the belt conveyors; means for effecting relative vertical motion between the belt conveyors and the roller conveyor means to enable a cant to be transferred from the belt conveyors to the roller conveyor means with the orientation in which the cant was established by the orienting stops; and means for driving the rollers of the roller conveyor means in unison in one direction to effect translatory motion of the oriented cant towards edging cutters.

With the above stated objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a perspective view of a machine which embodies the principles of this invention and by which cants can be scanned and can then be properly oriented and moved towards edging cutters;

FIG. 3b is a fragmentary view in front elevation of the orienting station apparatus, illustrating the same in the condition shown in FIG. 3a;

Figure 3A:
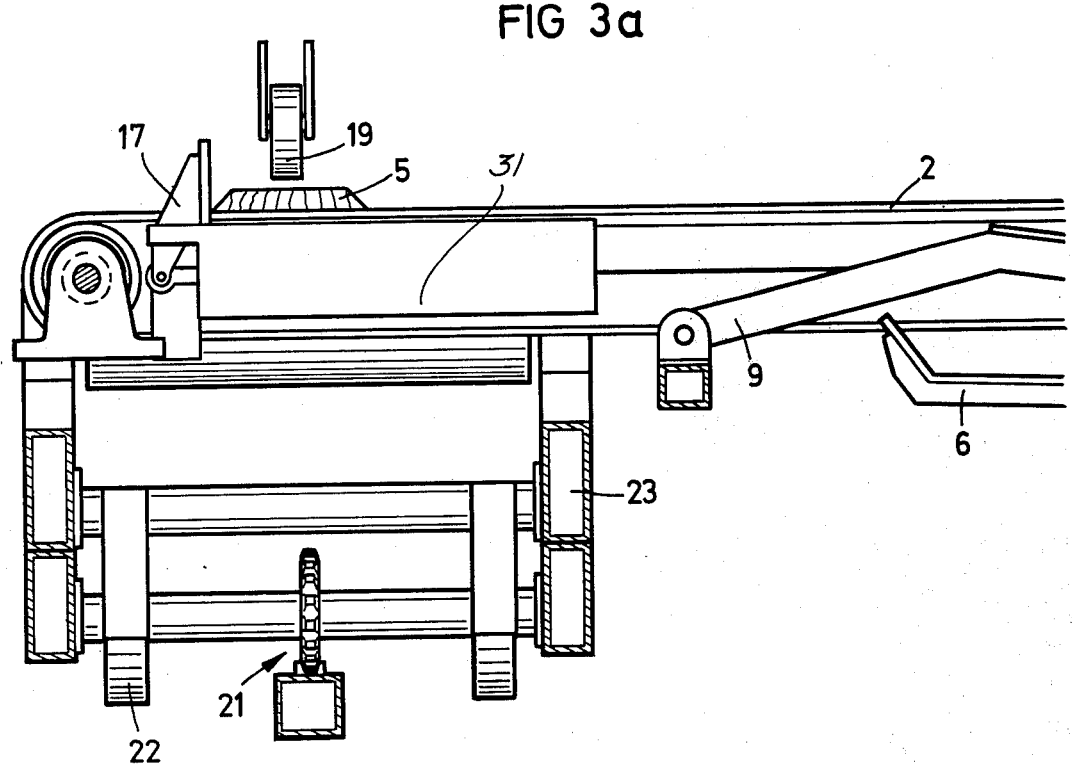
FIG. 3a is a fragmentary view in side elevation of the portion of the machine that comprises its orienting station, shown with a cant being arrested by orienting stops for orientation in accordance with calculations based on scanning data.
Figure 4A:
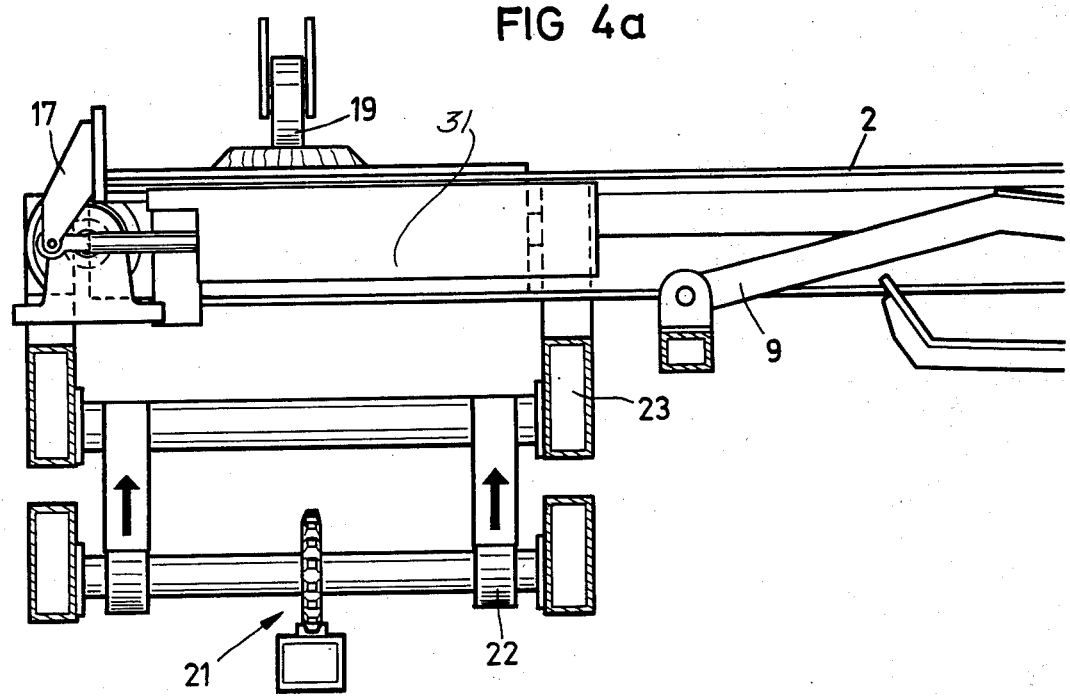
Figure 3B:
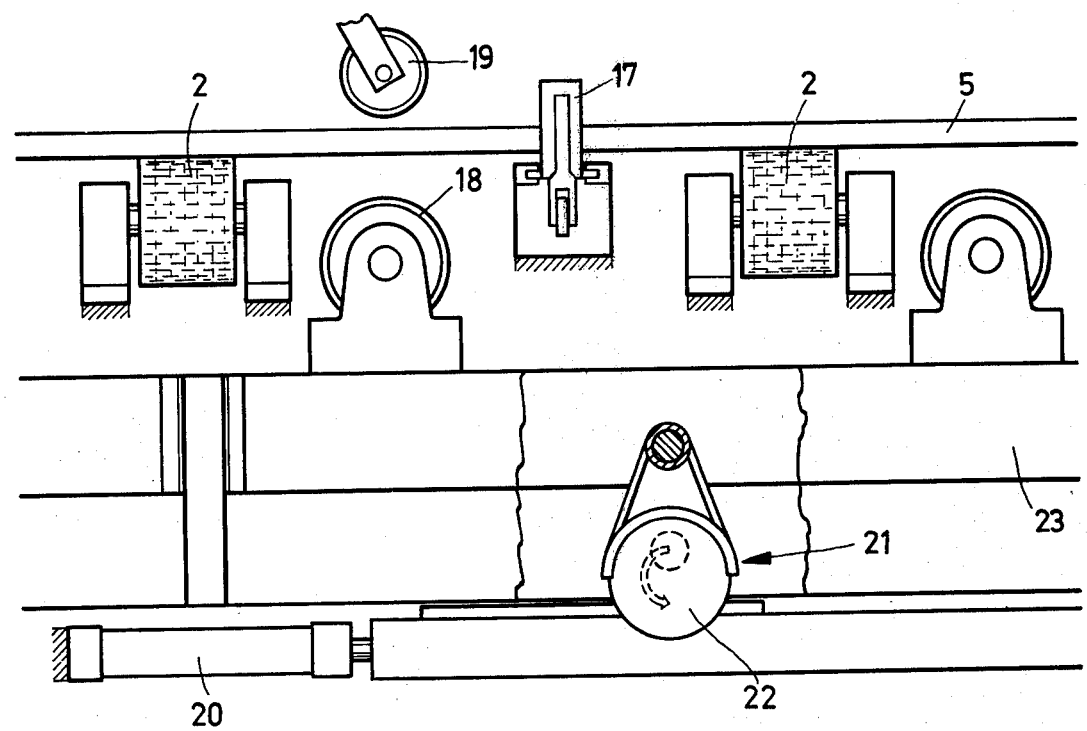
Figure 4B:
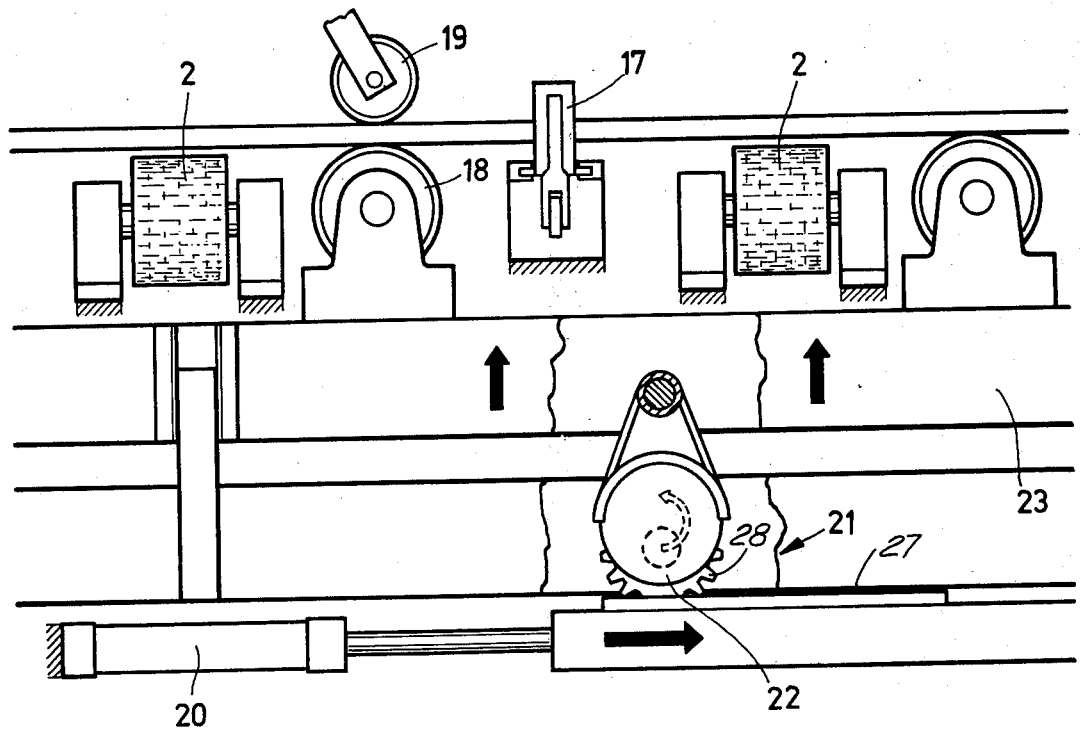

FIG. 4a is a view generally similar to FIG. 3a but illustrating the orienting station apparatus in the condition in which a cant is transferred to the roller conveyor means for transport towards edging cutters with the orientation established for it at the orienting station; and FIG. 4b is a view generally similar to FIG. 3b but showing the orienting station apparatus in the condition in which it is illustrated in FIG. 4a.

Referring now to the accompanying drawings, the numeral 1 designates generally the frame of a machine that embodies the principles of this invention. On it are mounted a plurality of belt conveyors 2 that have upper stretches disposed in a common horizontal plane and extending in parallel, laterally spaced relation to one another. By means of a common drive shaft 3 connected with a motor 4, the belt conveyors are so driven that their upper stretches move in unison, all in the same forward direction. Thus a cant 5 placed on the conveyors near the right hand end of the machine as shown in FIG. 1, and which extends across several of the belt conveyors with its length transverse to that of their stretches, is carried forwardly by the belt conveyors towards the left hand end of the machine. It will be understood that cants are placed on the belt conveyors with their narrower finished surfaces uppermost.

From a method standpoint, a cant thus placed on the belt conveyors is transported by them to a scanning station located about midway between their ends. There, forward progress of the cant is arrested by engaging its leading edge at a pair of points thereon that are spaced lengthwise from one another by a substantial distance. The two points of engagement define a reference line on the cant to which scanning data can be related, which reference line coincides with a fixed datum line on the machine that extends transversely to the belts. After scanning, the cant is permitted to resume forward motion with the belt stretches and is carried forwardly away from the scanning station to an orienting station at which its forward motion is again arrested by engaging it at the same two points. At the orienting station the two points of engagement are so spaced from the datum line, in accordance with calculations made on the basis of the scanning data, that the second arresting of the cant disposes it in a required orientation. With that orientation the cant is translated in a direction transverse to the belt stretches to carry it through edging cutters 40, 41, and by reason of such orientation the edging cutters can convert the cant to a finished, standardized piece of optimum size. The manner in which the cant is removed from engagement with the belt conveyors and is caused to have the last-described translatory motion is described hereinafter.

Figure 2A:
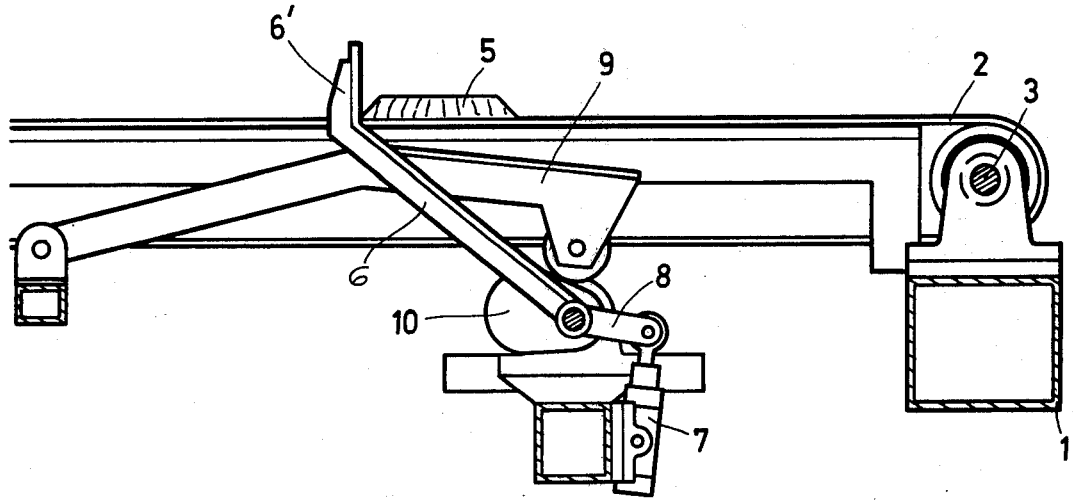
FIG. 2a is an enlarged fragmentary view in side elevation of apparatus in the machine shown in FIG. 1 that arrests a cant at a scanning station and establishes a reference line on the cant, said apparatus being shown in its condition for arrival of a cant at the scanning station.
Figure 2B:
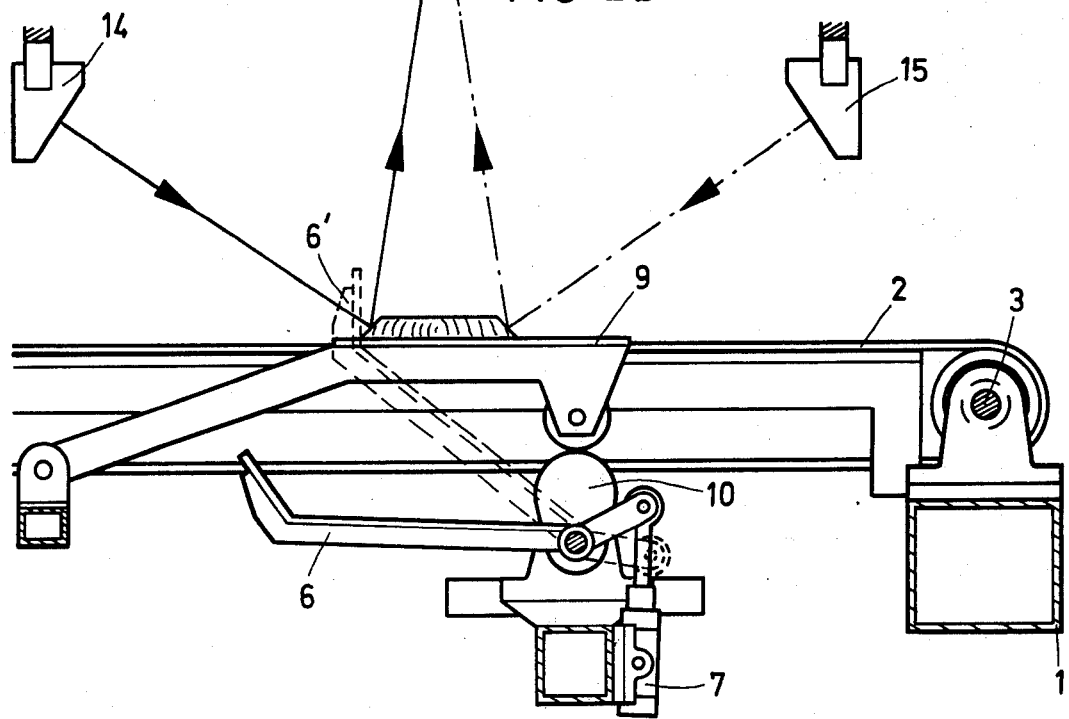
FIG. 2b is a view generally similar to FIG. 2a but showing the apparatus at the scanning station in its condition during the actual scanning operation.

The apparatus which defines the scanning station and the datum line and arrest a cant at that station comprises at least two scanning stops 6, the construction and operation of which are best understood by reference to FIGS. 2a and 2b. The scanning stops are constrained to generally vertical movement, to and from an operative position illustrated in FIG. 2a, and they are located in laterally spaced relation to the belt conveyors.

As shown, each of the scanning stops 6 comprises a lever that is medially pivoted to the machine frame 1. A shorter arm 8 of the lever is connected with a hydraulic or pneumatic piston motor 7 by which its longer arm can be raised and lowered. In an operative position of the scanning stop, a foot-like abutment portion 6' on its longer arm, which comprises the stop proper, projects a distance above the plane of the upper stretches of the conveyor belts to engage and arrest a cant thereon. The stop 6' is of course narrow in extent as measured along the datum line, to make substantially point contact with a cant.

To permit a cant to be carried away from the scanning station, each scanning stop is movable to an inoperative position in which it is shown in full lines in FIG. 2b and in which it is disposed wholly below the plane of the upper belt stretches. The inoperative position can be regarded as the normal one for each scanning stop.

In the illustrated machine, which comprises a substantially large number of rather narrow belt conveyors 2, there is scanning stop between each adjacent pair of belts. However, only two of the several scanning stops are brought to their operative positions as a cant approaches the scanning station, so that the cant is engaged at only two points on its leading edge. Of the several scanning stops, the two that are brought to operative position are those that are nearest to the opposite ends of the cant and inwardly of those ends. Selection of those two scanning stops for particular cant can be automatically controlled by sensing means (not shown), such as photoelectric cells that sense the length of a cant as it approaches the scanning station. By thus providing and controlling a number of scanning stops, cants of widely varying lengths can be accommodated, with assurance in each case that there will be an optimum distance between the points at which the cant is arrestingly engaged, to afford the best possible measuring accuracy.

Every scanning stop, when in its operative position, has its rear face on a single datum line that extends transversely to the belt stretches, and therefore any two scanning stops in operative position will define that line. The reference line on the cant, defined by the points on its leading edge that are engaged by the two operative scanning stops, will coincide with the datum line when the cant is at the scanning station.

To ensure that the cant is sationary while being scanned, it is preferably held out of engagement with the belt conveyors on scanning supports 9. As shown, there is a scanning support rearwardly adjacent to each scanning stop, each comprising an arm that has one end pivoted to the fixed frame 1 of the machine, as at 109, to swing up and down. At the free end of the arm there is a cam follower that rides on a cam 10. The cams for the several support arms 9 are fixed to a common shaft 11 (see FIG. 1) that is coupled to a motor 12 for actuation of the scanning supports in unison. In their inoperative positions (shown in FIG. 2a) the several scanning supports are all wholly disposed below the plane of the top stretches of the belt conveyors. When a cant 5 is engaged against the scanning stops, the motor 12 drives the eccentrics 10 through a partial revolution to raise the scanning supports, and they then engage the cant and lift it up out of contact with the belt conveyors as shown in FIG. 2b. Since the scanning stops have vertical cant engaging surfaces on their abutment portions 6', and the scanning supports have horizontal cant engaging surfaces, such elevation of the cant by the scanning supports does not disturb the orientation of the cant that has been established by the scanning stops.

While thus stationarily supported, the cant is scanned by means of a scanning device 13 which is mounted on an upper portion of the machine frame 1, directly above the scanning station. For the purposes of such scanning the cant is lighted alternately by each of a pair of elongated light banks 15 that are mounted on the machine frame at a level below the scanning device 13 and above the belt conveyors. The light banks extend lengthwise parallel to the cant and are spaced to opposite sides of it so that they shine obliquely across its top surface. When one light bank is lighted, it lights its adjacent wane surface of the cant and the entire top surface thereof, but leaves the opposite wane surface in shadow. Hence, by first lighting one light bank 15 and then the other, the longitudinal edges of the top cant surface are defined by distinct shadow lines which are readily detected by the photoelectric scanning device. Scanning is of course synchronized with the alternate lighting of the light banks 15. For further information about the scanning device 13, reference may be made to the above mentioned copending application.

The output of the scanning device 13 corresponds to measurements of the distance from the datum line (and therefore also from the reference line on the cant) to each of a number of points spaced along each longitudinal edge of the top surface of the cant. The scanning outputs are fed to a computer 16 which calculates the optimum distance between two straight parallel edging cuts and the optimum orientation of those cuts relative to the reference line that will convert the cant to a standardized finished piece with minimum wastage of material. In a known manner an output corresponding to the computed distance between edging cuts is employed to effect adjustment of a pair of edging cutters 40, 41 relative to one another. An output of the computer that corresponds to the required orientation of the reference line is employed to effect an adjustment of orienting stops 17 that define an orienting station which is spaced forwardly from the scanning station.

As soon as a cant is fully supported by the scanning supports 9, or at any time thereafter, up to the moment when forward movement of the cant is to be resumed, the two scanning stops that have arrestingly engaged the cant are returned to their inoperative positions. When scanning is completed, the scanning supports 9 are returned to their inoperative positions, lowering the cant back onto the belt conveyors so that it can resume forward motion towards the orienting station, at which it is again arrested by the orienting stops 17.

There must be at least two orienting stops, but in any case there should be an orienting stor for each scanning stop, and each orienting stop should be forwardly aligned with its scanning stop. The several orienting stops are confined to horizontal adjusting motion towards and from their respective scanning stops, that is, in directions lengthwise of the conveyor belt stretches. Each orienting stop has an inoperative position in which it is spaced forwardly of the orienting station, near the front end of the machine frame. Each orienting stop has its own servo 31 by which its adjustment is effected, and it will be understood that the servos 31 are arranged to be responsive to outputs from the commputer 16.

The several orienting stops normally occupy their inoperative positions at the front ends of the belt conveyors; but when the computer 16 has made its calculation on the basis of data obtained from scanning a cant at the scanning station, its output is employed to adjust the two orienting stops that are forwardly aligned with the scanning stops which have engaged that cant. Those orienting stops therefore engage the same two points on the cant that were engaged by the scanning stops, and, when the cant is engaged with them, they therefore lie on the reference line on the cant that was established at the scanning station. Accordingly, those two orienting stops are so adjusted that the difference between their respective distances from the datum line establishes the reference line on the cant at the required angle to the direction of translation of the cant through the edging cutters 40, 41, which direction is of course parallel to the datum line.

From the orienting station a cant is transported towards and through the edging cutters 40 and 41 by means of a roller conveyor that comprises cylindrical rollers 18 which have their axes parallel to the lengths of the conveyor belt stretches but which are laterally spaced from those stretches. The roller conveyor also comprises vertically movable carriage means 23 on which the rollers 18 are rotatably mounted and by which they can be elevated and lowered in unison. Suchh vertical motion of the roller conveyor carries it to a lowered inoperative position illustrated in FIG. 3b and to an elevated operative position illustrated in FIG. 4b. The location of the roller conveyor on the machine frame defines the orienting station.

In its inoperative position the roller conveyor is disposed wholly below the plane of the top stretches of the belt conveyors so that it does not interfere with transport of a cant from the scanning station to the orienting station. As the roller conveyor is raised from its inoperative position, its rollers 18 engage a cant at the orienting station and lift it off of the belt conveyors, so that when the roller conveyor is fully in its operative position, the cant is supported only by its rollers 18, at a level above the belt conveyors. Such transfer of a cant from the belt conveyors to the roller conveyor does not affect the orientation of the cant, inasmuch as the roller conveyor is confined to vertical translatory motion and the portions of the orienting stops that engage the cant have vertical rear surfaces.

The mechanism by which the roller conveyor is shifted up and down is shown as comprising a double acting hydraulic or pneumatic piston motor 20 that actuates a cogged rack 27 which is confined to lengthwise sliding motion on the machine frame. The rack meshes with a pinion 28 that is confined to rotation on the frame. A cam 22 is constrained to rotate with the pinion 28 and cooperates with a suitable cam follower on the carriage means 23 of the roller conveyor.

It will be understood that suitable mechanism (not shown) is provided for timing transfer of a cant from the belt conveyors to the roller conveyor so that the roller conveyor is not elevated from its inoperative position until the cant is fully engaged with the orienting stops. Such mechanism, which can comprise a photoelectric or similar sensor (not shown), is preferably also connected with the apparatus at the scanning station to prevent a cant from leaving the scanning station until a preceding cant has cleared the orienting station.

When a cant at the orienting station is transferred from the belt conveyors to the roller conveyor, the rollers of the latter are stationary. Before the cant can begin to move towards the edging cutters 40, 41, the two orienting stops 17 that have been engaged with it must be moved all the way forward to their inoperative positions, so that they will not interfere with purely translatory motion of the cant towards the edging cutters. Motors 24, drivingly connected with the rollers 18, are then started to rotate the rollers in unison so that they can translate the cant in a direction transverse to the belt stretches and parallel to the datum line, to carry it towards and through the edging cutters with the required orientation.

Preferably presser rollers 19, carried on the machine frame for yielding up and down motion and biased downwardly, engage the top surface of the cant when the roller conveyor is in its operative position, and they steady the cant and maintain it in good engagement with the rollers 18 to prevent any departure from the necessary translatory motion.

From the foregoing description taken with the accompanying drawings it will be apparent that this invention provides a simple and accurate method and apparatus for establishing a reference line on a cant to which data can be related that is obtained from scanning of the top surface of the cant, and whereby the cant can be established with that reference line at a predetermined angle to the direction of substantially lengthwise translatory motion of the cant towards and through edging cutters, so that the trimming of the cant that is effected by the edging cutters will convert it to a finished piece of optimum size as determined by calculations made on the basis of the data obtained by scanning.

Those skilled in the art will appreciate that the invention can be embodied in forms other than as herein disclosed for purposes of illustration.

I claim:

1. Apparatus by which a cant having substantially flat and parallel top and bottom surfaces and unfinished lengthwise extending wane surfaces can be oriented for substantially lengthwise translatory motion through a pair of spaced apart edging cutters by which the cant is converted into a finished piece of optimum size as determined by calculations made on the basis of data obtained with a scanning device at a scanning station, said apparatus comprising:
  A. a plurality of endless conveyors having elongated upper stretches which
    1. are disposed in a common horizontal plane,
    2. extend across said scanning station in lengthwise parallel laterally spaced relation to one another and
    3. are driven for unison lengthwise motion in a forward direction to cooperate in transporting past the scanning station a cant that extends transversely across time;
  B. a pair of scanning stops which are
    1. laterally adjacent to said stretches of the endless conveyors and
    2. spaced apart along a datum line at said scanning station that extends transversely to said stretches, said scanning stops having abutments which define said datum line and are engageable by the leading edge of a cant being transported on said stretches to hold the cant at the scanning station and establish a reference line on the cant to which data obtained during scanning of the cant can be related, said reference line corresponding with said datum line when the cant is so held;
  C. means for effecting relative vertical motion between the scanning stops and said stretches whereby the scanning stops can be established alternatively 1. in an operative position projecting above said plane for engaging a cant on said stretches, or
2. in an inoperative position wholly below said plane to permit a cant on said stretches to be carried beyond the scanning station;

D. an orienting stop for each scanning stop,
  1 located above said plane and
  2 forwardly aligned with its scanning stop, to engage said points on the leading edge of a cant that is being transported forwardly away from the scanning station and stop the cant;

E. means for adjustingly moving each orienting stop to any selected one of a plurality of operative positions that are at different distances in said forward direction from the datum line, to enable the orienting stops to cooperate in establishing a cant with its said reference line in an optimum orientation according to calculations made on said data;

F. feed conveyor means arranged to carry a cant towards the edging cutters with horizontal translatory motion and in a direction transverse to said forward direction, said feed conveyor means being at a location adjacent to the orienting stops;

G. means for effecting relative vertical motion between the feed conveyor means and said stretches, to enable a cant to be transferred from said stretches to the feed conveyor means after the cant has been oriented by its engagement with the orienting stops, so that the cant can be translated towards the edging cutters by the feed conveyor means; and H. means for moving each orienting stop to an inoperative position which is farther in said forward direction from said datum line than any of said operating positions of the orienting stop, so that the orienting stop does not disrupt the established orientation of the cant when it is moved towards the edging cutters by the feed conveyor means.

2. The apparatus of claim 1, further characterized by:
  1. cant supporting means at a fixed location defining said scanning station and providing upwardly facing surfaces, spaced apart transversely to the lengths of said stretches, upon which a cant can be supported during scanning; and
  2 means for effecting vertical relative motion between said stretches and the cant supporting means, for transfer of a cant between said stretches and said cant supporting means and to enable the latter to stationarily support the cant out of contact with said stretches while the cant is being scanned.

3. The apparatus of claim 1, further characterized by:
  1 there being at least one additional scanning stop, all of said scanning stops being spaced from one another along a line transverse to the lengths of said stretches;
  2 each of said scanning stops being individually movable vertically to and from its said position at which it is engageable with a cant on said stretches; and
  3 means for causing only those two scanning stops to be moved to the last mentioned position that are nearest to the ends of a cant on said stretches and inwardly of said ends.

4. A method of orienting a cant having substantially flat and parallel top and bottom surfaces and untrimmed lengthwise extending wane surfaces, to so dispose the cant for substantially lengthwise translatory motion through a pair of spaced apart edging cutters that the cant is thereby converted into a finished piece of optimum size as determined by calculations made on the basis of a scanning of the top surface of the cant at a scanning station, and in which method the cant is carried to the scanning station and beyond the same to a location at which the cant is oriented as aforesaid by means of a plurality of endless conveyors having elongated, parallel and laterally spaced apart upper stretches that lie in a common horizontal plane and are driven in unison in a forward direction, said method comprising:

A. placing a cant, top surface uppermost, onto said upper stretches near the rear ends thereof, with the cant lengthwise substantially transverse to the lengths of said stretches;

B. at a scanning station located spaced from both ends of the belt conveyors, engaging the leading edge of the cant, at a pair of spaced apart points thereon, to confine the cant against forward movement with said upper stretches and establish a reference line on the cant which extends through said pair of points and to which data obtained during scanning can be related;

C. while the cant is stationary at the scanning station, scanning it to obtain data concerning the relationship of the longitudinal edges of its top surface to said reference lines;

D. on the basis of said data, adjusting a pair of orienting stops, one for each scanning stop and each aligned in said direction with its scanning stop and spaced in said direction therefrom, to bring the orienting stops to positions such that they cooperate to define a line corresponding to the optimum orientation of said reference line for translation of the cant through edging cutters in a direction transverse to said direction of motion of said stretches;

E. vertically disengaging the scanning stops from the cant and, after scanning, causing the cant to resume motion with said stretches of the belt conveyors so that it is carried by them into engagement with both orienting stops;

F. effecting relative vertical motion between said stretches of the endless conveyors and a set of conveyor means arranged to carry a cant in horizontal translatory motion in a direction transverse to said stretches of the endless conveyors, to transfer the cant from the belt conveyors to said conveyor means and cause the cant to be supported by said conveyor means, out of engagement with said stretches;

G. moving the orienting stops in the direction away from the scanning stops to disengage them from the cant; and H. driving said conveyor means to translate the cant substantially lengthwise in said direction transverse to the lengths of said stretches and towards the edging cutters.

5. A method by which a cant having substantially flat and parallel to top and bottom surfaces and unfinished lengthwise extending wane surfaces can be established in an orientation determined to be optimum for substantially lengthwise translation of the cant along a defined straight horizontal path through a pair of edging cutters, said orientation being determined in accordance with calculations based on data obtained from scanning the top surface of the cant at a scanning station, and said translation of the cant being effected by conveyor means, said method being characterized by:

A. drivingly supporting the cant, top surface uppermost, for motion transversely to its length and in a forward horizontal direction transverse to said path and towards said path;
B. substantially before the cant arrives at said path, arresting forward motion of the cant at a scanning station by engaging the cant at a pair of points on it that are spaaced along its leading edge,
  1 said points of engagement being on a fixed datum line which is parallel to said path, and
  2 said points defining a reference line on the cant which coincides with said datum line while the cant is arrested at the scanning station;
C. after scanning of the top surface of the cant, releasing the cant to permit it to resume motion in said forward direction away from the scanning station and towards said path;
D. adjusting a pair of orienting stops which are near said path and which are aligned in said forward direction with said points on the cant, to position said stops at distances from the datum line such that their engagement by the cant establishes it in an orientation in which said reference line thereon is at an optimum angle to said path according to calculations made on the basis of data obtained by scanning;
E. with the cant so oriented, and by a vertical relative translation of it, engaging the cant with said conveyor means for translation of the cant along said path; and
F. before effecting translation of the cant along the path, moving said orienting stops to inoperative positions at substantially greater forward distances from the datum line so that they do not disturb such orientation of the cant as it is being translated along said path.

* * * * *

UNITED STATES PATENT OFFICE
CERTIFICATE OF CORRECTION

PATENT NO. : 3,970,128
DATED : July 20, 1976
INVENTOR(S) : ULRICH KOHLBERG

It is certified that error appears in the above-identified patent and that said Letters Patent are hereby corrected as shown below:

| | |
|---|---|
| Col. 1, line 63: | "wo" should read --or-- |
| Col. 5, line 18: | "a" should be inserted after "is" |
| line 26: | "a" should be inserted after "for" |
| Col. 6, line 51: | "stor" should read --stop-- |
| Col. 7, line 23: | "Suchh" should read --Such-- |
| Col. 8, line 51: | "time" should read --them-- |
| Col. 9, line 8: | The period (.) after "stop" should be a comma (,) |
| Col. 10, line 15: | "located" should read --location-- |
| line 26: | "lines" should read --line-- |
| line 59: | "to" should be deleted |
| Col. 11, line 8: | "spaaced" should read --spaced-- |
| Col. 12, line 12: | "the" (second occurrence) should read --said-- |

Signed and Sealed this

Second Day of November 1976

[SEAL]

Attest:

RUTH C. MASON
*Attesting Officer*

C. MARSHALL DANN
*Commissioner of Patents and Trademarks*